United States Patent [19]
Van Den Bossche et al.

[11] Patent Number: 4,656,931
[45] Date of Patent: Apr. 14, 1987

[54] APPARATUS FOR AUTOMATICALLY WRAPPING ROUND BALES

[75] Inventors: Bart Van Den Bossche, Ghent; Rene A. Vandecandelaere, Houthulst, both of Belgium

[73] Assignee: New Holland Inc., New Holland, Pa.

[21] Appl. No.: 799,764

[22] Filed: Nov. 19, 1985

[30] Foreign Application Priority Data

Nov. 21, 1984 [EP] European Pat. Off. ......... 84201690.9

[51] Int. Cl.[4] .............................................. B65B 13/04
[52] U.S. Cl. ........................................... 100/4; 100/5; 56/341; 364/400
[58] Field of Search ...................... 100/5, 4, 13, 88, 99; 56/341, 342; 364/400

[56] References Cited

U.S. PATENT DOCUMENTS 2,336,491 12/1943 Luebben .
2,410,159 10/1946 Harrer et al. .
2,829,585  4/1958 Varvel .
3,910,178 10/1975 Eggers et al. .
4,150,614  4/1979 Schwartz ................................. 100/5
4,158,331  6/1979 Campbell ................................ 100/5
4,169,410 10/1979 Richardson ............................. 100/5
4,182,235  1/1980 Harig .
4,282,803  8/1981 Cools ...................................... 100/5
4,306,494 12/1981 Nishibe et al. .
4,354,429 10/1982 Boldenow ............................... 100/5
4,402,259  9/1983 Viaud .
4,437,399  3/1984 Koning ................................ 100/5 X

FOREIGN PATENT DOCUMENTS 0041444  5/1981 European Pat. Off. .
0085817  2/1982 European Pat. Off. .
0057122  8/1982 European Pat. Off. ................. 100/5
0115995  8/1984 European Pat. Off. ................. 100/5
0117817  9/1984 European Pat. Off. ................. 100/5
2640563  5/1979 Fed. Rep. of Germany .

Primary Examiner—Billy J. Wilhite
Attorney, Agent, or Firm—Derrell F. Marquette; Frank A. Seemar; Larry W. Miller

[57] ABSTRACT

An automatic twine wrapper (31) for a round baler (10) is provided comprising a twine dispensing arm (36) having a retracted home position and which is movable in the vicinity of the bale chamber inlet (41). A drive motor (42) is operably coupled with the dispensing arm (36) for moving the latter during the twine dispensing cycle and automatic control means (65) are coupled with the drive motor (42) for causing the drive motor (42) to move the dispensing arm (36) in accordance with a predetermined dispensing cycle from its retracted home position toward the bale chamber inlet (41) and in the vicinity thereof and back to its home position as the twine dispensing cycle is being completed. The control means (65) comprises a starter means (50) operable to initiate the predetermined dispensing cycle and detector means (61) operable to detect whether twine (32) is being wrapped upon the bale (R). The detector means (61) generates a first signal when twine (32) is not being wrapped upon the bale and a second signal when twine wrapping has started. The control means (65) further comprises a time delay (92) coupled with the detector means (61) which is operable to check the condition detected by the detector means (61) at a predetermined point in the dispensing cycle for causing at least temporary interruption of the dispensing cycle in the presence, at said point, of said first signal, and for permitting uninterrupted continuation of the dispensing cycle when, at said point in the cycle, the detector means (61) generates said second signal.

10 Claims, 3 Drawing Figures

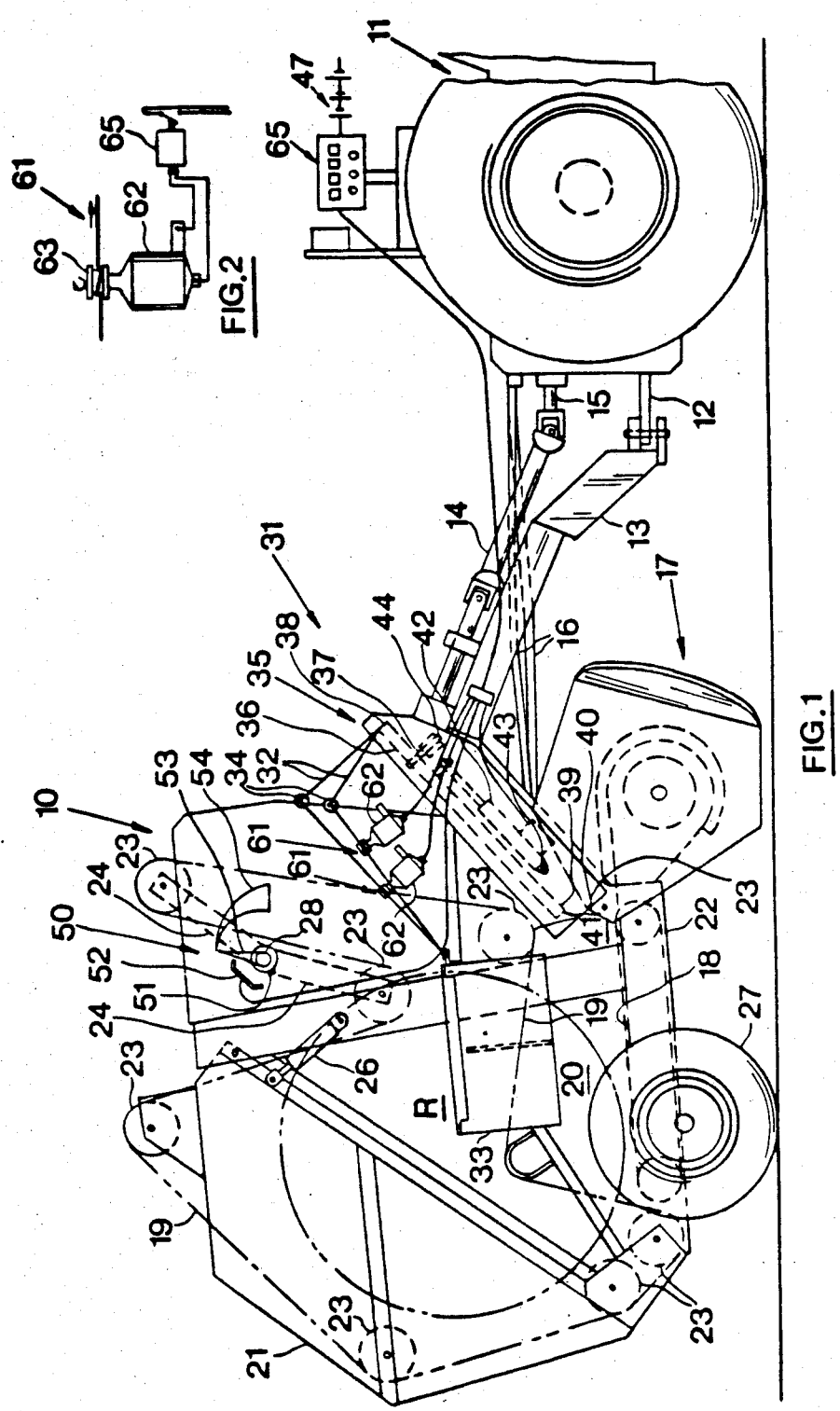

APPARATUS FOR AUTOMATICALLY WRAPPING ROUND BALES

BACKGROUND OF THE INVENTION

This invention relates to machines for forming round bales of crop material and has particular reference to the wrapping of bales formed in such machines with a flexible binding filament such as conventional baling twine.

In recent years, the practice of harvesting crop material, such as hay or the like, by forming it into large rolls through the use of large roll or round balers, has become increasingly popular. Typically such a machine is moved through a field, receiving crop into a bale forming chamber where it is rotated and is compacted as it accumulates and until a bale of the desired size has been formed. With bales formed in such manner, the need for some type of binding to hold the bale together in its generally cylindrical configuration after it has been discharged from the baling machine, has been recognized from the outset. Accordingly, it has become conventional, as the final phase of formation of a bale in a rotary baler, to continue rotating the bale after it has attained essentially the desired size, while introducing to the periphery of the rotating bale the free end of a length of twine that is anchored in the rotating mass of crop material, so that the length of twine may then be fed and guided relative to the rotating bale to form a binding around the bale in a pattern dependent upon the manner in which the twine is guided with respect to the axial dimension of the rotating bale. The twine is typically fed from a container under appropriate tension through a guide tube or arm whose twine dispensing extremity is shiftable along the axial dimension of the bale.

A variety of techniques and mechanisms for controlling movement of the twine guiding arm have been used, ranging from a simple rope tied to the dispensing arm to be manually pulled by a baler operator for shifting the discharge end of the arm along the axial dimension of the bale, to surprisingly complex mechanical, electrical and even fluid powered arrangements. Most of these twine wrapping devices have typically required the attention during wrapping of the bale of the baler operator and some continuing manual control by him over the movement of the twine dispensing arm. For example, U.S. Pat. No. 4,022,120 teaches movement of the guide tube by means of a reversible electric motor, which is energized to run in either direction or is de-energized by manipulation of a manual switch by the operator of the baler.

Automatic twine wrappers that serially undertake the various steps of the twine wrapping cycle without any operator involvement have also been used in the art.

Operators and manufacturers of the more recent large roll forming machines quickly realized that the less time required for the twine wrapping cycle, the more time there would be for gathering crop material from the field to form completed crop rolls. Therefore, round balers have been the focal point of many ideas for developing twine wrapping means or apparatus that will appreciably decrease the amount of time required for the twine wrapping cycle, as well as active operator involvement in the cycle. Regardless of whether the twine wrapping apparatus is manual, powered or automatic, the time required to complete the cycle is directly a function of the amount of time it takes to dispense the binding material about the periphery of the completed crop roll. When only a single dispensing means is used to oscillate across the bale forming region to dispense binding material, the time required will necessarily be longer than if multiple dispensing means of some types are used to bind the full length of a completed crop roll. Accordingly, the use of multiple elongated dispensing tubes has been proposed which oscillate simultaneously across distinct portions of the entire length of a completed crop roll whereby the length of time required for the twine wrapping cycle to be completed, is substantially decreased. Other multiple twine dispensing means have twine dispensing arms which all are arranged to oscillate across the full width of the bale in a manner to apply overlapping strands of baling twine upon a bale in the bale chamber. In this arrangement individual loops of each individual twine may be spaced further apart so that again a twine wrapping cycle of reduced length is obtained. Obviously, when multiple dispensing tubes are used, these multiple dispensing tubes require the corresponding use of multiple strands of binding material.

The operation of the multiple dispensing apparatus must be synchronized so that the strands of binding material dispensed from the elongated dispensing tubes are wrapped about the completed crop roll and severed at approximately the same instant so that the twine wrapping cycle may be promptly terminated and the completed roll ejected from the crop roll forming machine.

The multiple dispensing tubes are optimally employed with any type of a powered twine wrapping apparatus that can easily drive the multiple dispensing tubes. In the context of the present invention they have been specifically designed to function with automatic twine wrapping means to effect the binding of the completed crop roll in the least amount of time possible and with the least possible operator attention and involvement.

With such automatic multiple twine wrapping apparatus certain problems nevertheless still may be encountered during operation. Indeed, once an automatic twine wrapping cycle is started, all successive steps in the cycle are automatically completed one after the other. When the cycle is started, the twine dispensing arms initially are moved from a retracted home position toward the vicinity of the bale chamber inlet, at which point in the cycle, the free ends of the baling twine are permitted to enter said chamber and whereafter actual wrapping is started while that the twine dispensing arms automatically continue to move back-and-forth in the vicinity of the bale chamber inlet. It may occur, however, that one or more free ends of baling twine hesitate to enter the bale chamber or do not enter said chamber at all at said particular point in the cycle, whereby a defective or no bale wrapping at all is obtained during the further back-and-forth movement of the twine dispensing arms. This means a loss of time as the twine wrapping cycle must be repeated prior to ejecting the bale and also means a wastage of twine in the event one or more strands of twine are correctly applied while that another strand is not applied, as indeed it normally is not practical to only apply the previously defective twine during the next wrapping cycle. The foregoing problem further also requires special attention of the operator to timely detect the problem, which may be difficult when operating, e.g., during night time or in dusty conditions. It also requires active involvement of the operator to start another wrapping cycle.

It further also will be appreciated that, in case of a multiple twine dispensing apparatus, it is essential that all twines are anchored into the bale at about substantially the same instant in the twine dispensing cycle.

So far, the problems as described have been related to multiple twine wrapping means. However, it will be clear that hesitation or failure of the twine to be anchored into a bale at the appropriate point in an automatic twine dispensing cycle also is problematic when a single twine wrapping apparatus is used. The same or similar problems also may exist with twine wrapping apparatus which are not fully automatic. Indeed, in some semi-automatic twine wrapping devices the operator may have to trigger the dispensing cycle at the correct moment, whereafter the whole cycle then may be completed automatically. Hesitation or failure of the binding twine to enter the bale forming chamber at the appropriate point in the twine dispensing cycle also adversely affects in these twine wrapping devices the desired operation.

One even could conceive that the same problems may occur with a fully, manually controlled cycle. Indeed, there may be circumstances where the operator cannot see, during a twine dispensing cycle, whether twine actually is picked up by a bale in the bale chamber at the appropriate moment, whereby he thus may cause the dispensing arm to move back-and-forth across the axial dimension of the bale without any twine actually being applied on the bale.

One attempt to overcome this type of problem has been described in U.S. Pat. No. 4,182,235 relating to a semiautomatic twine wrapper for a round baler having a twine actuated switch. In one embodiment a hand switch and a twine actuated switch are provided in parallel to each other. For wrapping a bale, the hand switch is manually closed by the operator to pivot the twine dispensing arm from a home position to a location in the vicinity of the baler infeed opening for permitting twine to enter the bale chamber and start wrapping whereafter the pull on the twine closes the other switch, thus relieving the operator from the obligation to continue holding the hand switch closed during the entire wrapping cycle.

Thus, operator's attention and intervention is required to wrap a bale with this prior art mechanism. Also, the moment when the twine actuator switch takes over the function from the hand switch is rather variable and it may be difficult for the operator to notice when the hand switch precisely may be released. Finally, in the event twine is not properly picked-up by the completed bale in the bale chamber, the operator has to continue pressing the hand switch during the entire wrapping cycle until the dispensing arm returns to its home position whereafter the drive to the machine should be disengaged and the operator should manually pull a sufficient length of twine from the dispensing arm to ensure proper twine anchorage during the next cycle.

In another embodiment of U.S. Pat. No. 4,182,235 the hand-switch and the twine controlled switch are again provided in parallel to each other. A further, normally closed switch is provided in series with the hand switch and is opened by a component of the dispensing mechanism when the dispensing arm reaches a predetermined position, preferably in the vicinity of the infeed opening. Upon completion of a bale, the operator closes the hand switch to approach the dispensing arm from its home position to its said predetermined position in the vicinity of the infeed opening, at which moment the additional switch is opened thus interrupting energization of the motor of the dispensing mechanism. When twine is picked up by the rotating bale in the bale chamber and thus a pull is exerted thereon, the twine controlled switch is closed, thus re-energizing the drive to the dispensing arm, whereafter the wrapping cycle is completed automatically. However, in the event the twine is not actually anchored in the rotating bale as is desired, the mechanism is fully blocked, as indeed it cannot anymore either be reversed or moved forward. The operator thus has to stop the drive and manually pull a sufficient length of twine from the dispensing arm to ensure that, after re-energizing the drive to the machine, the twine is properly anchored and thus the cycle is continued.

It is, therefore, an object of the present invention to overcome or to attenuate the foregoing disadvantages of known twine dispensing mechanisms. The present invention is particularly useful in combination with automatic twine dispensing apparatus of both the single and multiple type but may also be applied on other twine dispensing mechanisms.

SUMMARY OF THE INVENTION

According to the present invention, a baling machine is provided which has a bale-forming chamber for forming crop material into a generally cylindrical bale and which has means for supplying filament to be wrapped upon a bale as the later is rotated in the bale-forming chamber. The filament supplying means comprises a filament dispensing means having a home position. Drive means are coupled with the dispensing means for moving the latter. Automatic control means are coupled with the drive means for causing the drive means to move the dispensing means in a predetermined dispensing cycle from its home position. The automatic control means includes started means operable to initiate the predetermined dispensing cycle and detector means operable to detect filament being wrapped upon the bale. The detector means generates a first signal when filament is not being wrapped upon the bale and a second signal when filament wrapping has started.

The automatic control means further comprises a time delay coupled to the detector means for causing at least temporary interruption of said dispensing cycle in response to said first signal, and for permitting uninterrupted continuation of the dispensing cycle when the detector means generates said second signal.

In one embodiment of the invention the automatic control means is operable to terminate the interruption of the dispensing cycle when the detector means subsequently generates said second signal thereby indicating a delayed start of the filament wrapping.

However, in the preferred embodiment of the invention, the automatic control means is operable, in response to said first signal generated by the detector means, for returning the filament dispensing means to its home position.

Preferably, the detector means are filament motion detector means which are operable to produce said first signal in the absence of filament movement and the second signal in the presence of such movement. The filament motion detector means may comprise a piezoelectric pick-up disposed to be engaged by the filament at a position between a filament container and the filament dispensing means and which is arranged to respond to vibrations generated by the filament movement. Alternatively, the filament motion detector means are in the form of a filament driven electric generator operable to produce an electric signal when driven by said filament during wrapping movement thereof.

The automatic control means may comprise a microprocessor circuitry including an inhibit/start cycle circuitry coupled with the time delay. The time delay is operable, in the presence of said first signal, to inhibit the cycle to proceed further.

The starter means of the automatic control means preferably are formed by a bale diameter indicator operable to produce a signal in response to the bale in the bale chamber reaching a predetermined diameter for automatically initiating the dispensing cycle.

The filament supplying means may either be of a single type or of multiple type. In the latter case the filament supplying means comprises multiple filament dispensing means, each of which is arranged for dispensing an individual filament across either a distinct portion of the axial dimension of the bale to the wrapped or across the full axial dimension thereof. In multiple filament supplying means a detector means is associated with each individual filament and the automatic control means are arranged for causing said at least temporary interruption of the dispensing cycle in the presence of a first signal from at least one detector means and for permitting uninterrupted continuation of the dispensing cycle only when all detector means generate said second signal. Each detector means preferably comprises a detector logic and all detector logics are coupled to a "logical and"-function producing a dispensing cycle interrupting signal in the presence of at least one first signal generated by a detector means and producing a dispensing cycle enabling signal only when all detector means generate said second signal.

DESCRIPTION OF THE DRAWINGS

FIG. 1 is a right-hand side elevational view of the baling machine or baler;

FIG. 2 is a fragmentary view on a larger scale of a particular component of FIG. 1 and also shows some other components in block form.

DESCRIPTION OF THE INVENTION

Figure 3:
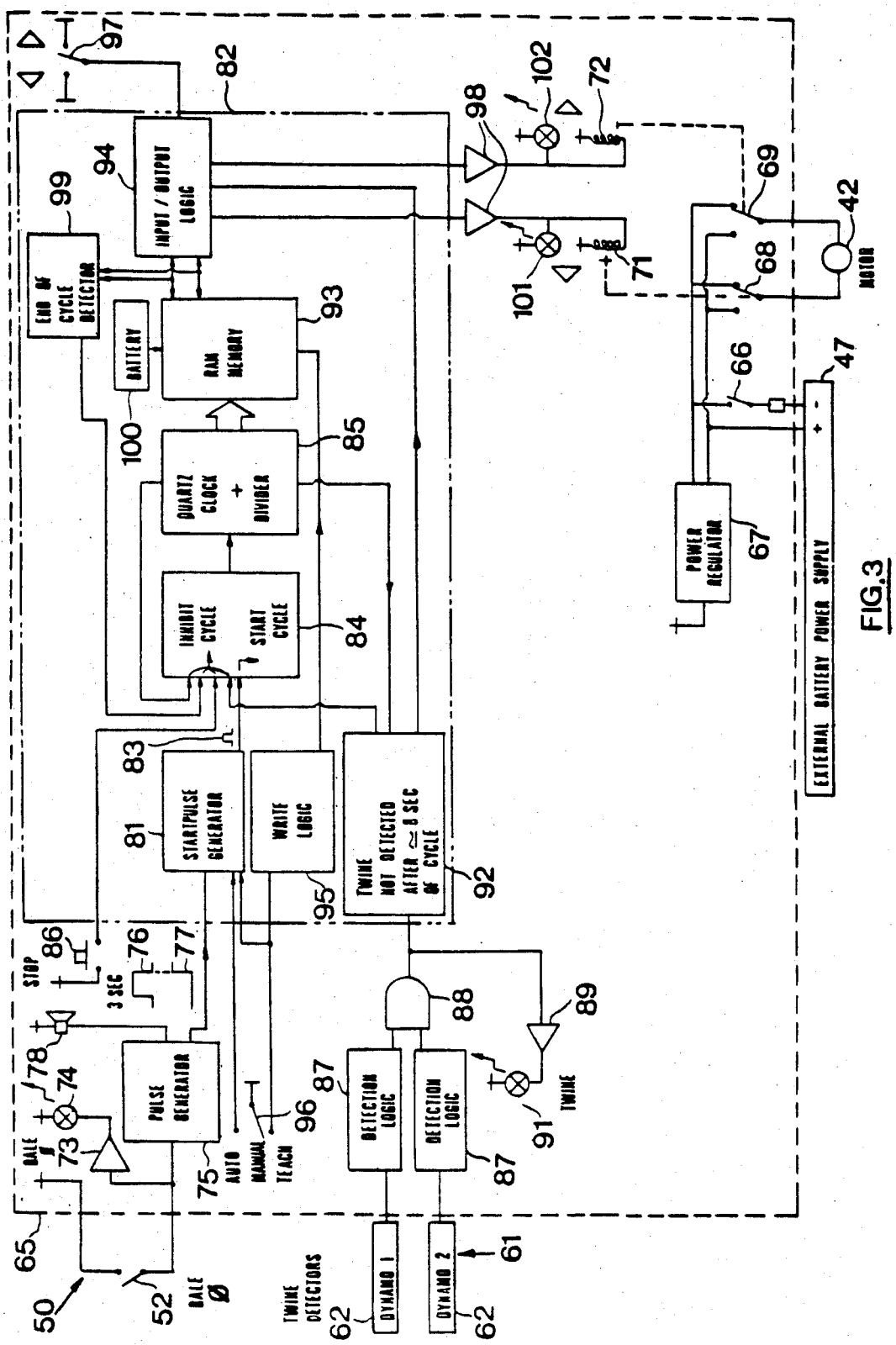
FIG. 3 is a diagrammatic depiction, partially schematic and partially in block form, of the improved automatic bale wrapping apparatus for use on a round baler in accordance with the invention.

In the following description, right-hand and left-hand references are determined by standing at the rear of the machine and facing in the direction of forward travel which is to the right as seen in FIG. 1. Also, in the following description it is to be understood that such terms as "forward", "rearward", "right", "left", "upwardy", and "downwardly" are words of convenience and are not to be construed as limiting terms.

Referring generally to FIG. 1, there is shown a crop roll forming machine or round baler 10, connected to a towing vehicle such as a tractor 11, by an appropriate hitch 12 and tongue 13. A power take-off shaft 14 connects the tractor power take-off 15 with the mechanicaly driven operational components of the baler 10. Hydraulic lines 16 connect the tractor hydraulic power source (not shown) with the hydraulically operable components of the baler 10. The machine has a crop pick-up, indicated generally by the numeral 17, which gathers the crop material from the field and delivers it to a lower roll bale forming member such as an apron, indicated generally by the numeral 18. This apron 18 conveys the material rearwardly into contact with the upper bale forming means 19.

The upper bale forming means 19 are mounted to an upper and a lower frame, indicated generally by the numerals 21 and 22 respecively, by means of a series of sprockets and guide rollers, shown generally by the numeral 23. The upper bale forming means 19 are extensible by means of a pair of take-up arms 24 mounted on both sides of the machine 10 which permit the upper bale forming means 19 to be fed out around the ever expanding periphery of the crop roll R as it is formed within a bale forming region defined generally by the upper bale forming means 19 and the lower apron 18.

The upper frame 21 is pivotally raiseable at the completion of a filament or twine wrapping cycle for ejection of the completed crop roll R by a pair of hydraulic cylinders 26, only one of which is shown. The baler 10 is mounted on a pair of wheels 27, of which again only one is shown.

The filament dispensing and guiding apparatus, briefly indicated hereinafter as twine wrapper, and to which the present invention applies, is indicated generally by the numeral 31. This twine wrapper may be of the single or multiple type such as shown respectively in U.S. Pat. Nos. 4,282,803 and 4,158,331. The twine wrapper mechanism shown in the drawings is of a multiple type twine wrapper mechanism.

The twine wrapping apparatus is mounted to the side of the lower frame 22 in a suitable manner. Binding filaments or twines 32 are dispensed from binding material storage and dispensing containers 33 suitably affixed to the side of the lower frame 22. The binding material 32 is guided by a suitable number of eyelets 34 to the twine dispensing tubes or arms 36, only one of which is shown in FIG. 1.

Twine cutting means are provided to sever the binding material at the conclusion of the twine wrapping cycle. A these twine cutting means are conventional in the art and as the instant invention is not concerned therewith, details thereof have not been shown in the drawings and further also will not be described hereinafter. Such a description may, however, be taken from e.g., U.S. Pat. No. 4,169,410.

The improved twine wrapping apparatus 31 generally includes a twine dispensing assembly generally indicated by the numeral 35 and selective components for actuating the assembly which comprise the parts of the improved mechanism constituting the present invention. The twine dispensing assembly 35 comprises the twine dispensing tubes or arms 36 already mentioned and which are pivotally mounted at 37 on the lower frame 22 and generally above the pick-up 17 and in front of the infeed opening 41 to the bale forming chamber 20.

Twine 32 from the supply 33 is routed via said eyelet 34 through the receiving ends 38 of the tubes 36 with short lengths of twine 40 extending or dangling from the opposite free ends 39 of the tubes 36. Each twine dispensing tube 36 has an inoperative home position in which the free end 39 is positioned remote from the baler infeed opening 41, and in which position baling twine is prevented from entering the bale chamber 20. Drive means in the form of an extendable and retractable electrical actuator 42 extend between a pivot 43 on the lower frame 22 and drive transmission means (not shown in any details for the sake of simplicity) common to all dispensing arms 36. Such common drive transmission means are generally known in the art and, therefore, will not be described in any further details. Said drive transmission means are coupled to the twine dispensing arms 36 offset from the pivotal mounting thereof and are operable upon actuation of the actuator 42 to move the dispensing arms 36 with their free ends 39 from their home positions toward locations in the vicinity of the infeed opening 41 and vice versa. The actuator is further also operable to move said dispensing arms 36 with their free ends 39 back-and-forth in the vicinity of said infeed opening 41 and across discrete portions of the axial dimension of the bale R being formed in the bale chamber 20 and in a manner for supplying and guiding binding twine 32 to said bale in said bale chamber 20 across substantially the full axial dimension thereof.

As is conventional, twine wrapping is initiated by approaching the free ends 39 of the twine dispensing tubes 36 toward the incoming layer of crop material on the pick-up 17 and in front of the bale chamber inlet opening 41 for the free ends 40 of the twines 32 to be engaged by said crop material and to be drawn into the bale chamber 20, where said free ends 40 become anchored in the bale R which continues to rotate in said bale chamber 20. As soon as the twines 32 are anchored in the bale R which continues to rotate in said bale chamber 20. As soon as the twines 32 are anchored in the bale, feeding of additional crop material into the bale chamber 20 is interrupted. Continued rotation of the bale during back-and-forth movement of the twine dispensing arm 36 in the vicinity of the inlet opening 41 pulls on the binding filaments or twines and extracts the same from the dispensing arms 36 and containers 33 thus causing said filaments or twines to become spirally wrapped upon the bale.

As already mentioned, the binding twines are severed toward the end of the wrapping cycle to separate the bale from the binding twines in the containers 33, whereby the bale is ready for ejection and whereby new free ends 41 of baling twines are made ready for the next bale.

A twine wrapper starter mechanism 50 in the form of a bale diameter indicator is provided for automatically initiating the wrapping cycle as the bale in the bale forming chamber 20 reaches a predetermined diameter. This bale diameter indicator may be formed by either a micro-switch or a so-called reed-switch associated with the pivot shaft 28 of the take-up arms 24 supporting the upper bale forming means 19.

In case a reed-switch is used, a magnet 51 is coupled to the shaft 28 and the actual switch 52 itself is fixedly mounted on the upper frame in the immediate vicinity of the path of the magnet 51. As the diameter of the bale under formation increases, the take-up arms 24 and the pivot shaft 28 are caused to pivot. As the magnet 51 becomes positioned closely adjacent the switch 52 when the bale R reaches its predetermined diameter, the contacts of said switch 52 are closed, thus producing an electric signal, as will be explained further hereafter.

It will be clear that the angular position of either the magnet or the switch may be adjustable for enabling automatic twine wrapping of bales of different diameter, as may be desirable.

A visual bale diameter indicator in the form of a pointer 53 equally may be coupled to the pivot shaft 28 for movement across a scale 54. While in FIG. 1, the visual indicator is shown on the side of the machine, it will be clear that this indicator preferably should be visible from the tractor and thus should be installed at the front of the baler.

A twine motion detector generally indicated by the numeral 61, is associated with each strand of baling twine 32 to be applied upon a bale for binding. One such detector 61 is provided in the event that the twine dispensing assembly 35 is of the single type and two or more such detectors 61 are provided in the event that the twine dispensing assembly 35 is of the multiple type. Only one detector 61 will be described as obvious, in case two or more detectors are needed, these detectors preferably should be identical.

Several embodiments of a twine motion detector are possible. It is the objective of such a detector to produce a signal when twine is actually being wrapped around a bale and to produce another signal (which effectively could be the absence of a signal) when twine is not being applied upon a bale.

In one preferred embodiment which is extremely simple and inexpensive, the twine motion detector is formed by a commercially available generator such as a dynamo 62 used on bicycles for energizing bicycle lights. The generator 62 is fixedly mounted on the baler 10 inbetween the twine container 33 and a twine dispensing arm 36 and is arranged to be driven by a strand of twine as the latter is being fed into the bale chamber 20. To this end, the head 63 coupled to the rotor of the generator is adapted for the baling twine to be looped therearound for about 360° and thus this head is slightly different from the head used for being driven by a bicycle tire when the generator is mounted on a bicycle for energizing its lights. In operation and when twine is being wrapped around a bale in the bale chamber, said twine is driving the rotor of the generator thus generating an electric voltage which is applied to a control box to be described in more detail hereinafter.

The twine motion detector alternatively also may be formed by an equally commercially available detector in the form of a piezo-electric pick-up capable of generating an electric signal in response to a specific vibration as may be produced by twine running over said detector and to produce a different signal (or no signal) in the absence of such vibration. In this arrangement, twine should be routed so that it constantly engages the detector as it extends from the container 33 to the twine dispensing tube 36. While this embodiment operates fully satisfactorily, it is remarked that this solution is several times more expensive than the solution with the bicycle generator described hereinabove.

Another twine motion detector is shown and described in U.S. Pat. No. 4,182,235 and comprises basically a twine actuated on-off switch, actuation of which is derived from the pull on the baling twine as the latter is being fed into the bale chamber for wrapping.

The electric signals generated by the twine motion detector or detectors 61 and the bale diameter indicator 50 are relayed to a control box generally indicated by the numeral 65 and still to be described in further details hereinafter. The control box 65 is further also coupled to a power source in the form of a battery 47 and is connected via a power line to the electric actuator 42 of the twine dispensing assembly 35. The control box 65 preferably comprises a display panel with indicator lights and further switches as will be described hereinafter. Said control box preferably is conveniently positionable in the vicinity of the operator's seat on the tractor.

With particular reference to FIG. 3, the control box 65 now will be described in more detail. The various components of the box together with the various warning lights, switches, etc. provided on the display panel are schematically represented within the dotted line rectangle with the external components coupled to said box being shown schematically outside the dotted line rectangle. In summary, these external components are: the external battery power supply 47, the motor or electric linear actuator 42, the twine motion detectors 61 (two such detectors are shown in FIG. 3), but as already mentioned, only one such detector is needed when the twine dispensing assembly 35 is of the single type) and the bale diameter indicator 50.

A main on-off switch 66 is provided for energizing, respectively shutting off the automatic control system. A power regulator 67 set at 5 V provides power to all electronic components of the control system. The full 12 V electric power is applied via the reversed polarity switches 68-69 to the electric actuator 42. Closure of the switches 68-69 in one direction causes the actuator 42 to extend and closure in the other direction causes the actuator 42 to retract. The reverse polarity switches 68-69 are associated with relais coils 71-72 respectively.

The bale diameter indicator 50 is coupled via an amplifier 73 to a diameter indicator light 74 which is arranged to light on as the predetermined bale diameter for wrapping the bale is reached. The bale diameter indicator 50 further also feeds a pulse generator 75, which, when the predetermined diameter is reached, produces two signals 76 and 77 respectively. The first signal 76, e.g., may last for about three seconds, and is used to temporarily energize a buzzer 78 to produce an audible signal indicating to the operator that the predetermined diameter has been obtained and that the forward movement of the baler soon will have to be stopped.

The second signal 77 generated by the pulse generator 75 upon actuation of the bale diameter 50, succeeds the three seconds signal 76 and is applied to a startpulse generator 81 of a micro-processor circuitry indicated generally by the numeral 82 and to be described further hereinafter.

The two generators of the twine motion detectors 61 are coupled to detection logics 87 which in turn feed a "logical and"-function 88 adapted to generate an output signal only when both twine motion detectors 61 detect twine movement. This signal is applied via an amplifier 89 to a warning light 91 which lights on when both twines are actually being wrapped upon a bale in the bale-forming chamber 20. The output signal from the "logical and"-function 88 is also applied to a time delay 92 of the micro-processor circuitry 82.

The micro-processor circuitry 82 comprises a RAM memory 93 and is programmable as will be explained hereinafter. The micro-processor circuitry 82 is specifically designed for use in a twine dispensing assembly and further also comprises the startpulse generator 81 already mentioned and which is coupled via an inhibit/start cycle circuitry 84 and a quartz clock/divider circuitry 85 to the RAM memory 93 and to an input/output logic 94. The mirco-processor 82 further also comprises a write logic 95 and the time delay 92 already mentioned.

Assuming the RAM memory 93 is empty or a new program should be written into the memory, the auto/manual/teach switch 96 should be set on TEACH, thus making the write logic operative together with all other micro-processor components as is conventional, to write a new program into the RAM memory 93.

To this end, an initial twine wrapping cycle is controlled manually via the manual actuator switch 97 coupled via the input/output logic 94 and amplifiers 98 to the relais coils 71-72 already mentioned. Of course, the operator should initiate this initial wrapping cycle only after the bale diameter indicator 50 has indicated the presence in the bale-forming chamber 20 of a bale of the predetermined diameter via as well the bale diameter indicator light 74 as the buzzer 78. After the audible signal from the buzzer has stopped, the operator still continues a short while to feed crop material into the bale-forming chamber while energizing, by means of switch 97, the actuator 42 to move the twine dispensing arms 36 from their retracted actuator 42 to move the twine dispensing arms 36 from their retracted home positions toward the vicinity of the baler infeed opening 41. Continued feeding of crop material into the bale-forming chamber will engage the ends of twine 40 dangling from the free ends 39 of the twine dispensing arms 36 and entrain the same into the bale chamber 20 where they will be anchored into the bale, which, of course, should continue to rotate to induce the wrapping of the twines upon the bale. From that moment onwards, the further feeding of additional crop material into the bale chamber preferably should be stopped. However, and as already mentioned, said bale still should continue to rotate during the further portion of the wrapping cycle.

During this continued rotation of the bale, the operator now should energize the actuator 42 to move the dispensing arms 36 back-and-forth across the axial dimension of the bale in accordance with any specific pattern as is desirable. Movement of the dispensing arms 36 may be stepwise and the number of steps and the time intervals separating successive steps may be chosen at will. Of course the length of twine used to wrap a bale will depend on the number of time intervals and on the length of these intervals. Also more loops of twine will be applied parallel to each other when the intervals are caused to last longer. Between parallel loops of twine, spiral loops of twine are applied as the dispensing arms 36 are moved in the axial direction during said steps.

As is conventional, the quartz clock and divider circuitry 85 is coupled back to the inhibit/start cycle circuitry 84 to stop the cycle in the event the capacity of the RAM memory 93 is exceeded. Similarly an end of cycle detector 99 is coupled back from behind the RAM memory 93 to the inhibit/start cycle circuitry to set back the latter to the start portion after completion of the wrapping cycle.

Upon completion of the TEACH cycle, the auto/manual/teach switch 96 normally should be turned on AUTO, whereafter the system is in order for wrapping further bales fully automatically and precisely in the same manner as the initial bale.

During further operation of the machine and when a further bale is rolled and reaches the predetermined diameter, the bale diameter indicator 50 is actuated thus causing diameter indicator light 74 to light on and buzzer 78 to provide the three seconds audible signal. Thereafter, the start pulse generator 81 is actuated triggering the micro-processor 82, whereby the program stored in the RAM memory 93 is read and the actuator 42 is energized to start movement of the twine dispensing arms 36 from their home position toward the vicinity of the bale chamber inlet 41. During this initial step in the cycle, the operator should continue to feed crop material into the bale-forming chamber 20 for a short while thus permitting the incoming crop material to engage the twines and to entrain the same into said chamber 20, whereafter further feeding of crop material should be interrupted.

However, the wrapping cycle should not be continued beyond this point unless all twines are actually anchored into the bale in the chamber 20 and thus positively are fed therein. This anchoring normally comes about five to seven seconds after the start of the wrapping cycle. The time delay 92 is programmed to check at about eight seconds after the start of the wrapping cycle whether the "logical and"-function function 88 generates an output signal indicating that all twines indeed are running. In the presence of this signal, the time delay 92 does not interfere in the cycle. However, when to the contrary, no output signal is received from the "logical and"-function 88, meaning that one or more twines failed to start wrapping, said time delay 92 will interrupt the wrapping cycle.

The micro-processor 82 may be arranged for, in this event, repeating with short intervals, the checking routine of twine movement until the desired condition, i.e., all twines running, is obtained, whereafter the twine wrapping cycle may be resumed and continued. Alternatively, and indeed preferably, the system may be designed for, when the "logical and"-function 88 does not produce an output signal at about eight seconds after the initiation of the wrapping cycle for the reasons as explained above, automatically interrupting the cycle and setting the system back to its start position, whereby, under the conditions as set out, the twine dispensing arms 36 automatically are returned to their home position instead of the cycle being continued. A new startpulse is generated by the generator 81 thus starting the entire cycle all over again. During these steps, the operator should continue to feed more crop material into the machine for the reasons as already explained, so that all twines finally may be anchored into the bale to be wrapped.

Should this not help to start the wrapping, then there is a need for the operator to check further aspects, as indeed it may be that a twine container 33 is empty, or that the free end 40 of one or more twines are not properly positioned relative to the discharge ends 39 of the respective twine dispensing arms 36.

The automatic control system further also may be switched on MANUAL with the auto/manual/teach switch 96, whereafter manual actuation of the twine dispensing assembly 35 with the actuator switch 97 remains possible, while all indicators, such as the indicator lights remain operative.

The system equally may comprise an emergency stop button 86 which is coupled to the inhibit/start cycle circuitry 84 and which may be used in case of emergency, such as e.g., when a solid object would obstruct the movement of the twine dispensing arms 36. It will be appreciated that the emergency stop button 86 may be actuated to instantaneously arrest movement of the twine dispensing mechanism 35 as well during the stroke from the retracted home position to the fully extended position as during the return stroke back to the home position.

It is also remarked that the RAM memory 93 may be coupled to an auxiliary battery 100 for keeping the memory alive for at least a certain period of time after the system has been switched off by means of the on/off switch 66.

It is also noted that, while, as explained above, the micro-processor 82 is programmable, the time delay 92 preferably is fixed, meaning that the time delay 92 is integrated in the system from the outset. This also means that the time delay 92 is equally operative, during the "TEACH" mode to interrupt the wrapping cycle being taught, in the event that, at the predetermined time interval of e.g., eight seconds after the application of the start pulse 77 to the start pulse generator 81, wrapping of at least one twine has not yet started. This may occur when the operator, during the "TEACH" mode, unduly delays the start of the wrapping cycle after the buzzer 78 indicates that the desired bale diameter has been reached. This characteristic prevents the operator to program a less than ideal wrapping cycle, which inevitably would be more time consuming because of its retarded start.

Finally, FIG. 3 also shows indicator lights 101, 102 in parallel with the relais coils 71-72, which indicate the direction of movement of the twine dispensing arm 36.

From what precedes, it will be evident that a programmable twine dispensing apparatus is provided which is very flexible in its use and which, once programmed is fully automatic. The apparatus further also comprises a self-test system in the sense that means are provided which check whether twine wrapping has actually started at the appropriate moment in the entire twine dispensing process and which is operable when a defect in this respect has been detected, to immediately interrupt the cycle on the one hand and to take immediate corrective action to resolve the problem automatically on the other hand, both with the aim to reduce time loss as well as twine wastage while limiting the need for operator's attention to an absolute minimum as well as making operator involvement superfluous.

While that the preferred structure, as well as a number of variations thereof in which the principles of the present invention have been incorporated, are shown and described above, it is to be understood that the invention is not to be limited to the particular details thus presented, but, in fact, widely different means may be employed in the practice of the broader aspects of this invention. The scope of the appended claims is intended to encompass obvious changes in the details, materials and the arrangement of parts which will occur to one of skill in the art upon a reading of this disclosure.

Having thus described the invention, What is claimed is:

1. In a baling machine having a bale forming chamber for forming crop material into a generally cylindrical bale and having means for supplying filament to be wrapped upon a bale as it is rotated in the bale forming chamber; the filament supplying means comprising filament dispensing means having a home position, drive means operably coupled with the dispensing means for moving it; automatic control means coupled with the drive means for causing the drive means to move the dispensing means in a predetermined dispensing cycle from its home position, the automatic control means including starter means operable to initiate said predetermined dispensing cycle and detector means operable to detect filament being wrapped upon the bale; the detector means generating a first signal when filament is not being wrapped upon the bale and a second signal when filament wrapping has started; the improvement wherein:

the automatic control means further comprises a time delay coupled with the detector means for causing at least temporary interruption of the movement of the dispensing means in said dispensing cycle in response to said first signal and for permitting uninterrupted continuation of the movement of the dispensing means in said dispensing cycle when the detector means generates said second signal.

2. In a baling machine according to claim 1, wherein the automatic control means is operable to terminate said interruption when the detector means subsequently generates said second signal thereby indicating a delayed start of the filament wrapping.

3. In a baling machine according to claim 1, wherein the automatic control means is operable, in response to said first signal generated by the detector means, for returning the filament dispensing means to its home position.

4. In a baling machine according to claim 1 wherein the detector means comprises a filament motion detector operable to produce said first signal in the absence of filament movement and said second signal in the presence of filament movement.

5. In a baling machine according to claim 4, wherein the detector means comprises a piezo-electric pick-up disposed to be engaged by the filament at a position between a filament container and the filament dispensing means and arranged to respond to vibrations generated by the filament movement.

6. In a baling machine according to claim 4, wherein the detector means comprises a filament driven electric generator operable to produce an electric signal when driven by said filament during wrapping movement thereof.

7. In a baling machine according to claim 1, wherein the automatic control means comprises a micro-processor circuitry including an inhibit/start cycle circuitry coupled with the time delay, and wherein the time delay is operable, in the presence of said first signal, to inhibit the cycle to proceed further.

8. In a baling machine according to claim 1, wherein the starter means is formed by a bale diameter indicator operable to produce a signal in response to the bale in the bale chamber reaching a predetermined diameter for automatically initiating the dispensing cycle.

9. In a baling machine according to claim 1, wherein the time delay is operable to check the condition detected by the detector means at a predetermined point in the dispensing cycle.

10. In a baling machine according to claim 9, wherein said predetermined point in the dispensing cycle is in the range of six to ten seconds after the start of the dispensing cycle.

* * * * *